(12) United States Patent
Qu

(10) Patent No.: US 12,506,363 B2
(45) Date of Patent: Dec. 23, 2025

(54) ELECTRONIC DEVICE

(71) Applicant: GUANGDONG OPPO MOBILE TELECOMMUNICATIONS CORP., LTD., Guangdong (CN)

(72) Inventor: Chunying Qu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 748 days.

(21) Appl. No.: 17/847,154

(22) Filed: Jun. 22, 2022

(65) Prior Publication Data
US 2022/0329107 A1 Oct. 13, 2022

Related U.S. Application Data

(63) Continuation of application No. PCT/CN2020/138948, filed on Dec. 24, 2020.

(30) Foreign Application Priority Data

Dec. 24, 2019 (CN) .......................... 201911351936.8

(51) Int. Cl.
*H02J 7/00* (2006.01)
*H02J 7/02* (2016.01)
(Continued)

(52) U.S. Cl.
CPC .......... *H02J 50/12* (2016.02); *H02J 7/00308* (2020.01); *H02J 7/007* (2013.01); *H02J 7/02* (2013.01);
(Continued)

(58) Field of Classification Search
None
See application file for complete search history.

(56) References Cited

U.S. PATENT DOCUMENTS

2003/0231001 A1  12/2003  Bruning
2007/0153561 A1*  7/2007  Mickle .................... H02J 50/27
                                                             340/10.34
(Continued)

FOREIGN PATENT DOCUMENTS

CN  108233454  6/2018
CN  109120029  1/2019
(Continued)

OTHER PUBLICATIONS

EPO, Communication for EP Application No. 20907617.3, Mar. 19, 2024.
(Continued)

*Primary Examiner* — Arun C Williams
(74) *Attorney, Agent, or Firm* — Hodgson Russ LLP

(57) ABSTRACT

An electronic device is provided, belonging to the technical field of power charging. The electronic device includes a wired charging circuit, at least two wireless charging circuits, and a battery. The wired charging circuit and each the wireless charging circuit are connected to the battery. The wired charging circuit is used for receiving input electrical energy by a wired power interface, and charging the battery with the input electrical energy. Each the wireless charging circuit is used for receiving an alternating magnetic field, outputting electrical energy under a driving of the alternating magnetic field, and charging the battery with the output electrical energy. In this situation, charging power during a power charging process is improved to a certain extent.

20 Claims, 5 Drawing Sheets

(51) Int. Cl.
*H02J 50/12* (2016.01)
*H02J 50/40* (2016.01)
*H02J 50/80* (2016.01)

(52) U.S. Cl.
CPC ............ *H02J 50/402* (2020.01); *H02J 50/80* (2016.02); *H02J 2207/20* (2020.01)

(56) References Cited

U.S. PATENT DOCUMENTS

| | | | |
|---|---|---|---|
| 2012/0293151 A1* | 11/2012 | Labaziewicz | H02M 3/07 323/311 |
| 2013/0020988 A1 | 1/2013 | Kim et al. | |
| 2013/0214733 A1 | 8/2013 | Liang et al. | |
| 2014/0009120 A1 | 1/2014 | Kim | |
| 2014/0184171 A1 | 7/2014 | Lee et al. | |
| 2014/0266011 A1 | 9/2014 | Mehta et al. | |
| 2015/0362333 A1 | 12/2015 | Miller et al. | |
| 2016/0064962 A1 | 3/2016 | Huang et al. | |
| 2017/0366091 A1 | 12/2017 | Langeslag et al. | |
| 2019/0379245 A1 | 12/2019 | Wan | |
| 2020/0274402 A1* | 8/2020 | Hwang | H02J 50/12 |
| 2020/0412169 A1 | 12/2020 | Chen et al. | |
| 2021/0044155 A1* | 2/2021 | Chen | H02J 50/10 |
| 2022/0285969 A1 | 9/2022 | Kim et al. | |

FOREIGN PATENT DOCUMENTS

| | | |
|---|---|---|
| CN | 208386174 | 1/2019 |
| CN | 109347187 | 2/2019 |
| CN | 208738925 | 4/2019 |
| CN | 110365070 | 10/2019 |
| CN | 110518668 | 11/2019 |
| EP | 2784904 | 10/2014 |

OTHER PUBLICATIONS

CNIPA, Notification to Grant Patent Right for Invention for CN Application No. 201911351936.8, Jun. 7, 2024.
CNIPA, First Office Action for CN Application No. 201911351936.8, Sep. 22, 2023.
WIPO, International Search Report and Written Opinion for PCT/CN2020/138948, Mar. 8, 2021.
EPO, Extended European Search Report for EP Application No. 20907617.3, May 9, 2023.
WIPO, International Search Report for PCT/CN2020/138040, Mar. 1, 2021.
EPO, Extended European Search Report for EP Application No. 20905679.5, May 15, 2023.
CNIPA, First Office Action for CN Application No. 201911349368.8, Jul. 27, 2024.
CNIPA, Second Office Action for CN Application No. 201911349368.8, Feb. 14, 2025.
CNIPA, Decision of Rejection for CN Application No. 201911349368.8, Apr. 24, 2025.
EPO, Communication for EP Application No. 20905679.5, Apr. 9, 2025.
USPTO, Non-Final Rejection for U.S. Appl. No. 17/846,358, filed Mar. 6, 2025.
USPTO, Final Office Action for U.S. Appl. No. 17/846,358, filed Aug. 28, 2025.

* cited by examiner

//  ELECTRONIC DEVICE

CROSS REFERENCE OF RELATED APPLICATION

This application is a continuation of International Application No. PCT/CN2020/138948, filed Dec. 24, 2020, which claims priority to Chinese Patent Application No. 201911351936.8, filed Dec. 24, 2019, the entire disclosures of which are incorporated herein by reference.

TECHNICAL FIELD

The present disclosure relates to the field of power charging technologies, and more particularly to an electronic device.

BACKGROUND

At present, there are many kinds of charging technologies for electronic devices. For example, wired charging technology and wireless charging technology are two commonly known power charging technologies. Among them, the wired charging technology is a kind of charging technology in which a power supply device provides electric energy to an electronic device in a wired mode. The wireless charging technology is a kind of charging technology in which a charging device provides electric energy to the electronic device in a magnetic field mode. In the wireless charging technology, the electronic device can be charged without wire connection between the charging device and the electronic device.

At present, charging power has become a major bottleneck of restricting the charging technologies, and therefore how to improve the charging power has become an urgent problem to be solved.

SUMMARY

An embodiment of the present disclosure provides an electronic device. The electronic device may include a wired charging circuit, at least two wireless charging circuits, and a battery. The wired charging circuit and each of the at least two wireless charging circuits are connected to the battery. The wired charging circuit is configured (i.e., structured and arranged) to receive input electric energy through a wired power interface and charge the battery with the input electric energy. The wireless charging circuit is configured to receive an alternating magnetic field, output electric energy under a driving of the alternating magnetic field, and charge the battery with the output electric energy.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION OF EMBODIMENTS

In order to make the purpose, technical solutions and advantages of the present disclosure clearer, embodiments of the present disclosure will be further described in detail below in combination with the accompanying drawings.

Wired charging technology and wireless charging technology are two common charging technologies for charging electronic devices. At present, the charging power has become a major bottleneck restricting the charging technology. This is because, on the one hand, the current in the charging circuit should not be too large for the consideration of controlling the heating of electronic device; on the other hand, the voltage in the charging circuit should not be too large due to the limitations of integrated circuit technology and cost. When the current and the voltage in the charging circuit cannot be further increased, it is difficult to further improve the charging power.

In view of this, an embodiment of the present disclosure provides an electronic device, which can increase the charging power and then increase the charging rate when the current and the voltage in the charging circuit cannot be further increased.

Figure 1:
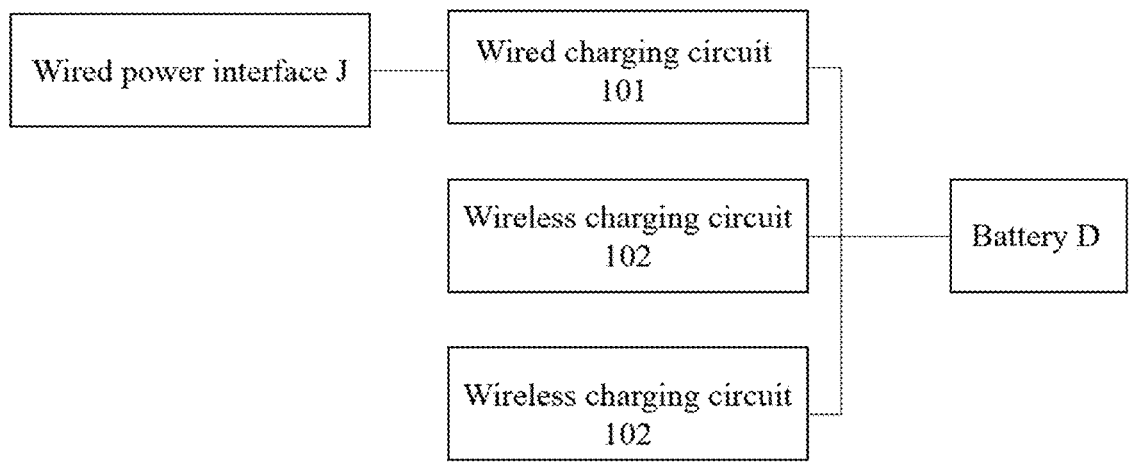
FIG. 1 is a schematic structural diagram of an electronic device provided by an embodiment of the present disclosure.

Referring to FIG. 1, FIG. 1 illustrates a schematic diagram of an electronic device provided by an embodiment of the present disclosure. The electronic device in the embodiment of the present disclosure may be an electronic device with charging function that needs to charge the battery, such as mobile phone, tablet computer, wearable device and e-book reader.

As shown in FIG. 1, the electronic device may include a wired charging circuit 101 and at least two wireless charging circuits 102 (in order to simplify the illustration, the drawings in the embodiment of the present disclosure only exemplary illustrates two wireless receiving circuits 102). The wired charging circuit 101 and each the wireless charging circuit 102 are connected to a battery D of the electronic device.

The wired charging circuit 101 is configured to receive input electric energy through a wired power interface J and charge the battery D with the input electric energy, that is, the wired charging circuit 101 is capable of charging the battery D by using the wired charging technology.

In actual implementation, the "power supply device" described above may be a device configured to provide electric energy, such as a power adapter or a mobile power supply. The "power supply device" may be connected to the wired power interface J in the electronic device through a cable and transmit electric energy to the wired power interface J through the cable. The wired power interface J may be connected to the wired charging circuit 101, which can input the electric energy transmitted by the "power supply device" through the cable into the wired charging circuit 101, so that the wired charging circuit 101 can charge the battery D with the electric energy. The wired power interface J may be universal serial bus (USB) 2.0 interface, micro-USB interface or USB TYPE-C interface. In some embodiments of the present disclosure, the wired power interface J may also be a lightning interface, or any other type of parallel port or serial port that may be configured to transmit electric energy. It should be noted that, in some embodiments of the present disclosure, the wired power interface J may be configured to transmit data in addition to transmitting electric energy.

The wireless charging circuit 102 is configured to receive an alternating magnetic field, output electric energy driven by the alternating magnetic field, and charge the battery D with the output electric energy, that is, the wireless charging circuit 102 can charge the battery D by using the wireless charging technology.

Generally, the wireless charging technology involves two types of devices: wireless charging device and wireless electric device (that is, the electronic device described in the embodiment of the present disclosure). The wireless charging device can provide electric energy for the wireless electric device during the wireless charging process. For example, the wireless charging device may be a wireless charging base, and the wireless electric device can use the electric energy provided by the wireless charging device to charge the battery.

Specifically, in the wireless charging technology, the wireless charging device can emit the alternating magnetic field under a driving of an alternating current (AC), and the electronic device can receive the alternating magnetic field emitted by the wireless charging device and output electric energy driven by the alternating magnetic field to charge the battery with the output electric energy.

The wireless charging circuit 102 in the embodiment of the present disclosure is a circuit configured in the electronic device for receiving the alternating magnetic field emitted by the wireless charging device and outputting electric energy driven by the alternating magnetic field to charge the battery D with the output electric energy.

In at least one embodiment of the present disclosure, at least one of the at least two wireless charging circuits 102 in the electronic device can support a wireless charging Qi protocol. The wireless charging Qi protocol is a wireless charging standard launched by Wireless Power Consortium (WPC), the world's first standardization organization promoting wireless charging technology, and has characteristics of convenience and universality.

It should be noted that in some embodiments of the present disclosure, the battery D may include a single battery or a single cell, or the battery D may include multiple batteries or multiple cells. When the battery D includes the multiple batteries or the multiple cells, the multiple batteries or the multiple cells may be connected to each other in series or in parallel. When the battery D includes the multiple batteries or the multiple cells, the wired charging circuit 101 and the wireless charging circuit 102 can charge each the battery or the cell separately, or charge the multiple batteries or the multiple cells as a whole.

It should also be noted that in the actual charging process, the electronic device can charge the battery D by using the wired charging circuit 101 alone, or by using the wireless charging circuit 102 alone. In some embodiment, the electronic device can also charge the battery D by using the respective at least two wireless charging circuits 102 at the same time, or by using the wired charging circuit 101 and one wireless charging circuit 102 at the same time. In some embodiment, the wired charging circuit 101 and the at least two wireless charging circuits 102 can also be configured to charge the battery D at the same time. It's not specifically limited in the embodiments of the present disclosure. In this way, it can ensure that the electronic device may be compatible with most of the current charging strategies and most of the charging scenarios, so as to increase the flexibility of charging the electronic device.

In summary, by setting the wired charging circuit and the at least two wireless charging circuits in the electronic device, the wired charging circuit and each the wireless charging circuit are connected to the battery of the electronic device. The wired charging circuit is configured to receive the input electric energy through the wired power interface and charge the battery of the electronic device with the input electric energy. The wireless charging circuit is configured to receive the alternating magnetic field and output electric energy driven by the alternating magnetic field and charge the battery of electronic device with the output electric energy. In this way, the electronic device can charge the battery by using the wired charging circuit and the at least two wireless charging circuits at the same time. Therefore, under the condition that the charging voltage and charging current of a single charging circuit cannot be further increased and the charging power does not change significantly, the overall charging power may be significantly improved.

Figure 2:
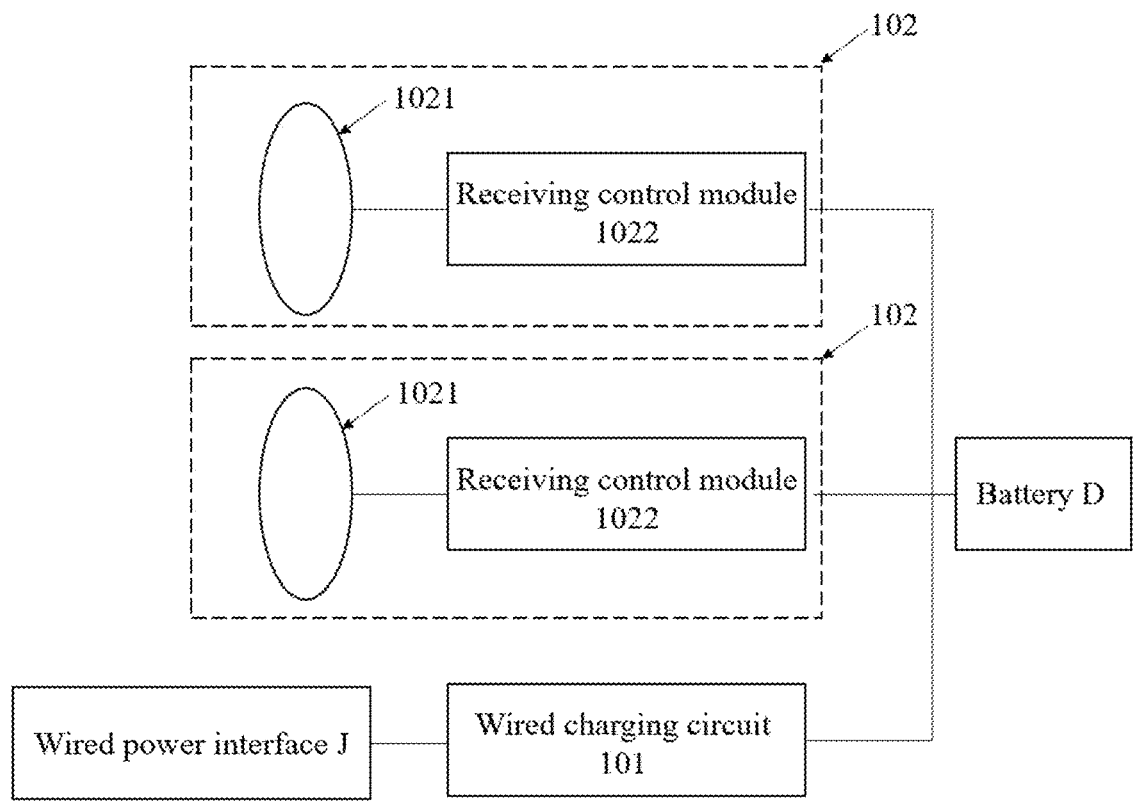
FIG. 2 is a schematic structural diagram of an electronic device provided by another embodiment of the present disclosure.

Referring to FIG. 2, in at least one embodiment of the present disclosure, the wireless charging circuit 102 may include a receiving coil 1021 and a receiving control module 1022 (also referred to receiving controller) connected to each other. In some embodiment, the receiving coil 1021 may be connected to an input of the receiving control module 1022, and an output of the receiving control module 1022 may be connected to the battery D.

The receiving coil 1021 is configured to receive the alternating magnetic field and output an alternating current driven by the alternating magnetic field. In some embodiment, the receiving coil 1021 may receive the alternating magnetic field and induce alternating current based on electromagnetic induction principle.

The receiving control module 1022 is configured to control input and/or output of the receiving coil 1021. In practical application, the receiving control module 1022 may be implemented in the form of a chip. For example, the receiving control module 1022 may be implemented in the form of a wireless receiver.

In some embodiment, in at least one embodiment of the present disclosure, the receiving control module 1022 may include an alternating current-direct current AC-DC conversion circuit and a communication circuit (not shown in FIG. 2).

The AC-DC conversion circuit is configured to convert the AC output from the receiving coil 1021 into DC, and use the converted DC to charge the battery D. In practice, the AC-DC conversion circuit may include a rectifier circuit and a filter circuit, or the AC-DC conversion circuit may include only a rectifier circuit.

The communication circuit is configured to send charging control data to a wireless charging device through the receiving coil 1021, and the charging control data is configured to instruct the wireless charging device to adjust the charging output power based on the charging control data.

In some embodiment, the communication circuit is configured to modulate and encode the charging control data, and send the modulated and encoded charging control data to the wireless charging device by using the receiving coil 1021. Specifically, the charging control data may include at least one of the output voltage and the output current of the wireless charging circuit 102, or the charging control data may include one of boosting control data and bucking control data.

In at least one embodiment of the present disclosure, the electronic device may further include a processing module configured to transmit the charging control data to the communication circuit. The processing module as a processing circuit may be a microcontroller unit (MCU) or an application processor (AP) of the electronic device.

In addition, in at least one embodiment of the present disclosure, the receiving control module 1022 may further include a control circuit configured to control the AC-DC conversion circuit, for example, the control circuit is configured to control a switch transistor in the AC-DC conversion circuit.

It should be noted that in an embodiment of the present disclosure, the receiving control module 1022 in each the wireless charging circuit 102 may include a communication circuit. In another embodiment of the present disclosure, the receiving control modules 1022 of some wireless charging circuits 102 of the at least two wireless charging circuits 102 may include a communication circuit.

In at least one embodiment of the present disclosure, the wireless charging circuit 102 may further include a capacitor (not shown in FIG. 2), the capacitor may be connected between the receiving coil 1021 and the receiving control module 1022. The capacitor and the receiving coil 1021 may form a resonant circuit.

Figure 3:
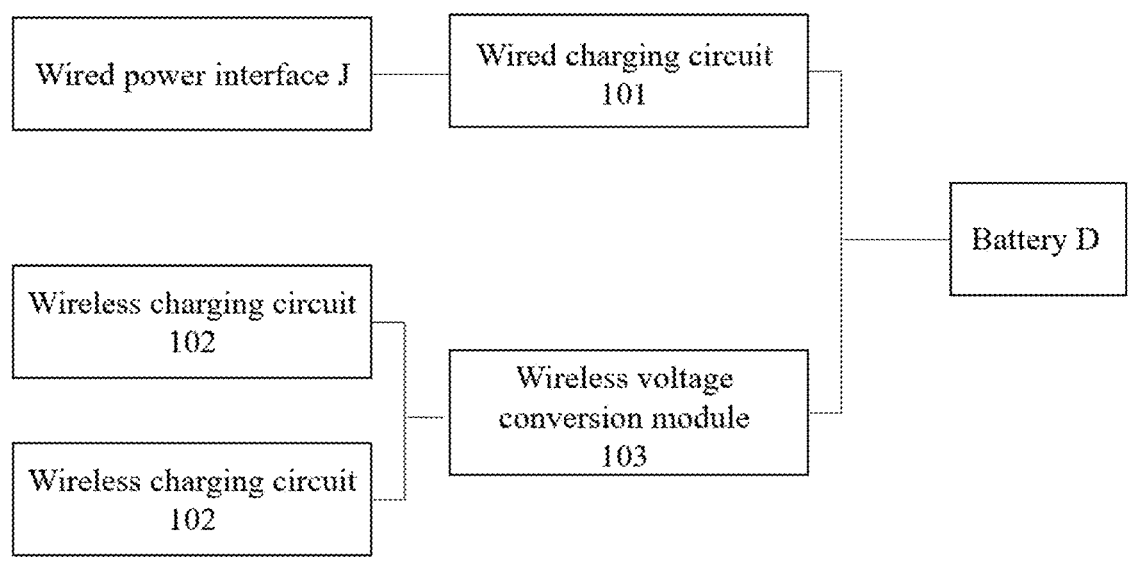
FIG. 3 is a schematic structural diagram of an electronic device provided by still another embodiment of the present disclosure.

Referring to FIG. 3, in at least one embodiment of the present disclosure, the electronic device may further include a wireless voltage conversion module 103 (also referred to as wireless voltage converter), and the wireless voltage conversion module 103 may be connected between the at least two wireless charging circuits 102 and the battery D.

The wireless voltage conversion module 103 is configured to convert the charging voltage and/or the charging current output from the at least two wireless charging circuits 102 connected to itself, and use the converted charging voltage and/or the converted charging current to charge the battery D.

Generally, the charging voltage and/or the charging current output from the at least two wireless charging circuits 102 are not necessarily suitable for charging the battery D. In order to protect the battery D and avoid damage to the battery D, the wireless voltage conversion module 103 may be set in the electronic device to convert the charging voltage and/or the charging current output from the at least two wireless charging circuits 102 by the wireless voltage conversion module 103, so as to safely charge the battery D with the converted charging voltage and/or the converted charging current.

In some embodiments, the wireless voltage conversion module 103 may include a direct current-direct current (DC-DC) voltage conversion module, which may be a buck type voltage conversion module, or a charger pump type (capable of both bucking and boosting) voltage conversion module.

In some embodiments, the electronic device may further include a processing module connected to the wireless voltage conversion module 103, and the processing module is configured to control the wireless voltage conversion module 103 to convert the charging voltage and/or the charging current output from the at least two wireless charging circuits 102 connected to the wireless voltage conversion module 103. The processing module may be MCU or AP.

The embodiment of the present disclosure provides two ways to set the wireless voltage conversion module 103. The two ways to set the wireless voltage conversion module will be described one by one below.

Figure 4:
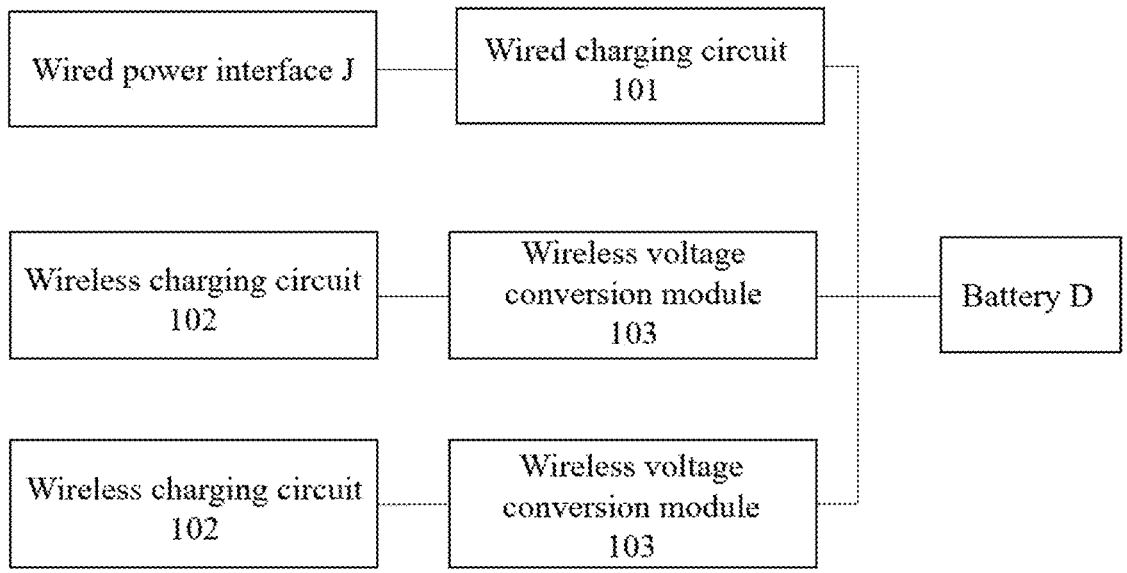
FIG. 4 is a schematic structural diagram of an electronic device provided by even still another embodiment of the present disclosure.

Referring to FIG. 4, in a first way of setting the wireless voltage conversion module 103, the electronic device may be provided with at least two wireless voltage conversion modules 103 correspond to the at least two wireless charging circuits 102 included in the electronic device in a one-to-one manner. Each the wireless voltage conversion module 103 may be connected between a corresponding one of the at least two wireless charging circuits 102 and the battery D.

In addition, in a second way of setting the wireless voltage conversion module 103, the electronic device may be provided with one wireless voltage conversion module 103 connected between the battery D of the electronic device and the at least two wireless charging circuits 102.

In at least one embodiment of the present disclosure, the wireless voltage conversion module 103 may include at least two wireless voltage conversion circuits connected in series. Each the wireless voltage conversion circuit is configured to convert input charging voltage and/or input charging current and output converted charging voltage and/or converted charging current.

In at least one embodiment of the present disclosure, the wireless voltage conversion module 103 may include at least two wireless voltage conversion circuits connected in parallel. Each the wireless voltage conversion circuit is configured to convert the charging voltage and/or the charging current output from the wireless charging circuit 102 connected to the wireless voltage conversion module 103, and use the converted charging voltage and/or the converted charging current to charge the battery D.

In an embodiment, the at least two wireless voltage conversion circuits connected in parallel may include a first wireless voltage conversion circuit and a second wireless voltage conversion circuit.

The first wireless voltage conversion circuit is configured to convert the charging voltage greater than a first voltage threshold and/or the charging current greater than a first current threshold. The second wireless voltage conversion circuit is configured to convert the charging voltage lower than the first voltage threshold and/or the charging current lower than the first current threshold.

At present, in order to improve the charging power and shorten the charging time, in the field of wireless charging technology, many wireless charging devices support driving electronic devices to charge the battery with higher charging voltage and/or higher charging current, which is commonly referred to as "fast charging" (i.e., fast-charging mode) or "flash charging"(i.e., flash-charging mode). In addition, in the field of wireless charging technology, many wireless charging devices may only drive electronic devices to charge the battery with lower charging voltage and/or lower charging current, which is commonly referred to as "ordinary charging" (i.e., ordinary-charging mode).

In order to be compatible with the two charging modes of wireless charging, the at least two wireless voltage conversion circuits connected in parallel may be set in the wireless voltage conversion module 103 of the electronic device, and the at least two wireless voltage conversion circuits may include a first wireless voltage conversion circuit and a second wireless voltage conversion circuit. Among them, the first wireless voltage conversion circuit is configured to support the fast-charging mode or the flash-charging mode, and the second wireless voltage conversion circuit is configured to support the ordinary-charging mode. In this way, the electronic device may be compatible with more charging modes, so as to improve the charging flexibility of the electronic device.

In another embodiment, the at least two wireless voltage conversion circuits connected in parallel may be the first wireless voltage conversion circuits respectively.

That is, the at least two wireless voltage conversion circuits connected in parallel are all configured to support the fast-charging mode or the flash-charging mode. Generally, in the fast-charging mode or the flash-charging mode, the heating of the electronic device is more serious. In order to alleviate the heating, the embodiment of the present disclosure may set the at least two first wireless voltage conversion circuits connected in parallel in the wireless voltage conversion module 103 of the electronic device, so as to shunt the charging current by the at least two first wireless voltage conversion circuits, so as to alleviate heating.

It should be noted that when the at least two wireless voltage conversion modules 103 are set in the electronic device, that is, in the first way of setting the wireless voltage conversion module 103 shown in FIG. 4, some of the wireless voltage conversion modules 103 in the at least two wireless voltage conversion modules 103 can support the fast-charging mode and the ordinary-charging mode. For this part of the wireless voltage conversion modules 103, it may be disposed with the at least two wireless voltage conversion circuits connected in parallel, the at least two wireless voltage conversion circuits may include a first wireless voltage conversion circuit and a second wireless voltage conversion circuit. The other part of the at least two wireless voltage conversion modules 103 may only support the fast-charging mode. For this part of the wireless voltage conversion modules 103, it may be disposed with at least two first wireless voltage conversion circuits connected in parallel to alleviate heating.

Of course, in practical implementation, only one path first wireless voltage conversion circuit may be set in the above part of the wireless voltage conversion modules 103 that only supports the fast-charging mode, which can reduce the overhead of hardware resources and reduce the overall cost of electronic device.

It should be noted that in some embodiments of the present disclosure, the first wireless voltage conversion circuit may include a charger pump type voltage conversion module, which can reduce the charging voltage by half. Further, the first wireless voltage conversion circuit may include two charger pump type voltage conversion modules. In some embodiments of the present disclosure, the second wireless voltage conversion circuit may include a pump type voltage conversion module.

Figure 5:
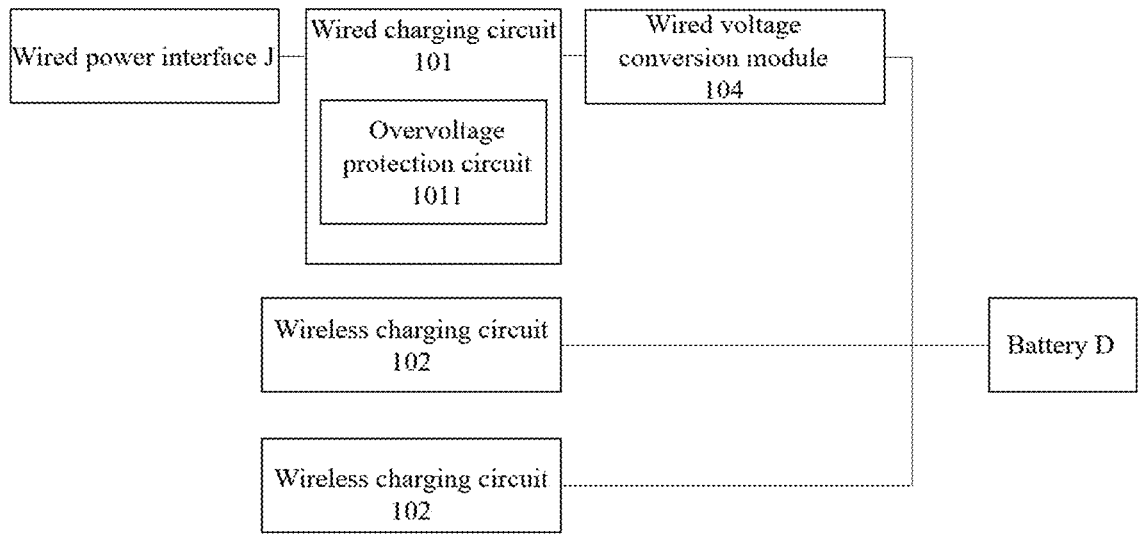
FIG. 5 is a schematic structural diagram of an electronic device provided by further still another embodiment of the present disclosure.

Referring to FIG. 5, in at least one embodiment of the present disclosure, the electronic device may further include a wired voltage conversion module 104 (also referred to as wired voltage converter) connected between the wired charging circuit 101 and the battery D.

The wired voltage conversion module 104 is configured to convert the charging voltage and/or the charging current output from the wired charging circuit 101, and use the converted charging voltage and/or the converted charging current to charge the battery D.

Similar to the wireless charging circuit 102, the charging voltage and/or the charging current output from the wired charging circuit 101 may not suitable for charging the battery D. In order to protect the battery D and avoid damage to the battery D, the wired voltage conversion module 104 may be set in the electronic device to convert the charging voltage and/or the charging current output by the wired charging circuit 101 by the wired voltage conversion module 104, so as to charge the battery D safely by using the converted charging voltage and/or the converted charging current.

In some embodiment, the wired voltage conversion module 104 may include a DCDC voltage conversion module, and the DCDC voltage conversion module may be a buck type voltage conversion module or a charger pump type voltage conversion module.

In some embodiment, the electronic device may further include a processing module connected to the wired voltage conversion module 104, and the processing module is configured to control the wired voltage conversion module 104 to convert the charging voltage and/or the charging current output from the wired charging circuit 101. The processing module may be a MCU or an AP.

Similar to the wireless voltage conversion module 103, in an embodiment of the present disclosure, the wired voltage conversion module 104 may include at least two wired voltage conversion circuits connected in series, each the wired voltage conversion circuit is configured to convert input charging voltage and/or input charging current and output converted charging voltage and/or converted charging current.

Similar to the wireless voltage conversion module 103, in another embodiment of the present disclosure, the wired voltage conversion module 104 may include at least two wired voltage conversion circuits connected in parallel, each the wired voltage conversion circuit is configured to convert the charging voltage and/or the charging current output from the wired charging circuit 101 and charge the battery D with the converted charging voltage and/or the converted charging current.

In at least one embodiment, the at least two wired voltage conversion circuits connected in parallel may include a first wired voltage conversion circuit and a second wired voltage conversion circuit.

Specifically, the first wired voltage conversion circuit is configured to convert the charging voltage greater than a second voltage threshold and/or the charging current greater than a second current threshold. The second wired voltage conversion circuit is configured to convert the charging voltage lower than the second voltage threshold and/or the charging current lower than the second current threshold.

At present, in order to improve the charging power and shorten the charging time, in the field of wired charging technology, many power supply device adapters can output higher voltage and/or higher current to support electronic devices to charge the battery with the higher charging voltage and/or the higher charging current, which is commonly referred to as "fast charging" or "flash charging". In addition, in the field of wired charging technology, many power supply device adapters may only output low voltage and/or low current to support electronic devices to charge the battery with the low charging voltage and/or the low charging current, which is commonly referred to as "ordinary charging".

In order to be compatible with the two charging modes of wired charging technology, the at least two wired voltage conversion circuits connected in parallel may be set in the wired voltage conversion module 104 of the electronic device. The at least two wired voltage conversion circuits may include a first wired voltage conversion circuit and a second wired voltage conversion circuit, the first wired voltage conversion circuit is configured to support the fast-charging mode or the flash-charging mode, the second wired voltage conversion circuit is configured to support the ordinary-charging mode. In this way, the electronic device may be compatible with more charging modes, so as to improve the charging flexibility of the electronic device.

In the following embodiments of the present disclosure, in order to alleviate the heating, multiple first wired voltage conversion circuits may be set in the wired voltage conversion module 104 of the electronic device.

In some embodiments of the present disclosure, the first wired voltage conversion circuit may include a charger pump type voltage conversion module, which can reduce the charging voltage by half. Further, the first wired voltage conversion circuit may include two charger pump type voltage conversion modules. In some embodiments of the present disclosure, the second wired voltage conversion circuit may include a pump type voltage conversion module.

In the embodiment of the present disclosure, since circuit elements included in the wired voltage conversion module 104 are similar to those included in the wireless voltage conversion module 103, some circuits of the wired voltage conversion module 104 may share with the circuits of the wireless voltage conversion module 103.

In some embodiment, since the circuit elements included in the first wired voltage conversion circuit are similar to those included in the first wireless voltage conversion circuit, in the embodiment of the present disclosure, the first wired voltage conversion circuit and the first wireless voltage conversion circuit may be set as the same circuit. Similarly, in the embodiment of the present disclosure, the second wired voltage conversion circuit and the second wireless voltage conversion circuit may be set as the same circuit.

Referring to FIG. 5, in at least one embodiment of the present disclosure, the wired charging circuit 101 may include an overvoltage protection circuit (OVP) 1011, and the overvoltage protection circuit is configured to buck a voltage when the voltage exceeds a voltage threshold.

It should be noted that the circuit structures shown in FIGS. 1 through 5 above may be combined arbitrarily to form the electronic device protected by the embodiment of the present disclosure.

Figure 6:
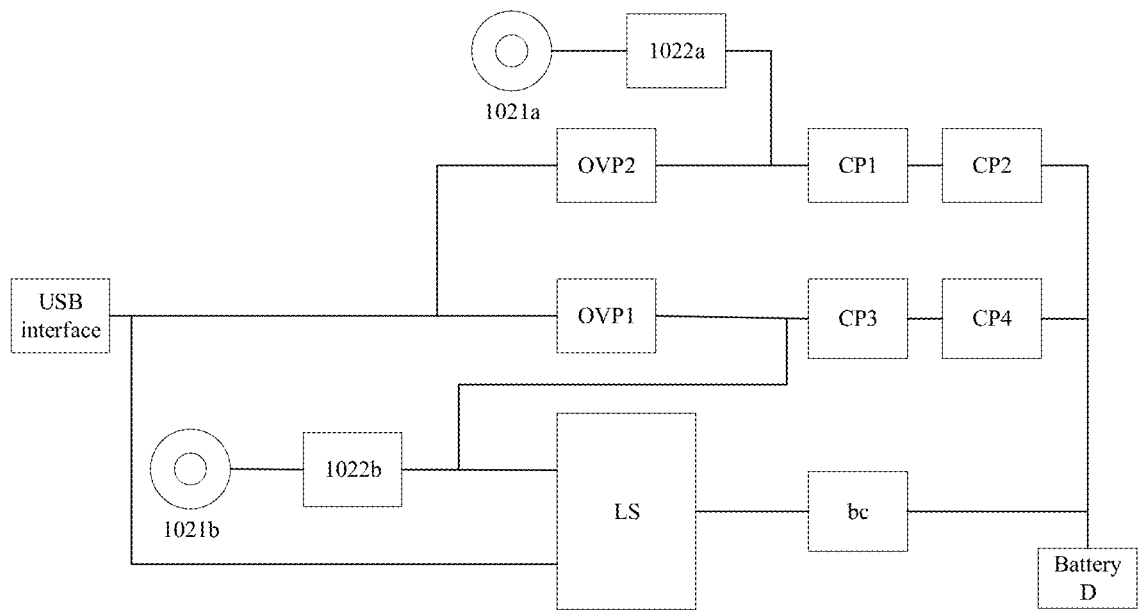
FIG. 6 is a schematic structural diagram of an electronic device provided by even further still another embodiment of the present disclosure.

Referring to FIG. 6, FIG. 6 illustrates a schematic diagram of an exemplary electronic device formed by a combination of some circuit structures in FIGS. 1 through 5.

As shown in FIG. 6, the electronic device may include two wireless charging circuits, one of which (hereinafter referred to as the first wireless charging circuit) includes a receiving coil 1021*a* and a wireless receiving chip 1022*a*, and the other wireless charging circuit (hereinafter referred to as the second wireless charging circuit) includes a receiving coil 1021*b* and a wireless receiving chip 1022*b*.

The first wireless charging circuit is connected to a wireless voltage conversion module (hereinafter referred to as the first wireless voltage conversion module). The first wireless voltage conversion module includes a first wireless voltage conversion circuit, and the first wireless voltage conversion circuit includes two charger pump voltage conversion modules (also referred to as charger pump voltage converter) connected in series, namely CP1 and CP2 respectively. The first wireless voltage conversion module is connected to the battery D of the electronic device.

The second wireless charging circuit is connected to a wireless voltage conversion module (hereinafter referred to as the second wireless voltage conversion module). The second wireless voltage conversion module includes a first wireless voltage conversion circuit and a second wireless voltage conversion circuit connected in parallel. The paralleled first wireless voltage conversion circuit includes two charger pump voltage conversion modules connected in series, namely CP3 and CP4 respectively. The paralleled second wireless voltage conversion circuit includes a load switch (LS) and a buck type voltage conversion module (bc) connected in series. The second wireless voltage conversion module is connected to the battery D of the electronic device.

The electronic device may further include a wired charging circuit connected to a wired power interface (i.e., USB interface in FIG. 6). The wired charging circuit includes two overvoltage protection circuits connected in parallel, namely OVP1 and OVP2.

The wired charging circuit is connected to the wired voltage conversion module. The wired voltage conversion module includes a second wired voltage conversion circuit and two first wired voltage conversion circuits connected in parallel. The second wired voltage conversion circuit includes a LS and a bc connected in series. One of the two first wired voltage conversion circuits includes two charger pump type voltage conversion modules connected in series, namely CP1 and CP2 respectively. The other first wired voltage conversion circuit includes two charger pump voltage conversion modules connected in series, namely CP3 and CP4 respectively.

As described above, the second wired voltage conversion circuit in the wired voltage conversion module and the second wireless voltage conversion circuit in the wireless voltage conversion module may be the same circuit, and the first wired voltage conversion circuit in the wired voltage conversion module and the first wireless voltage conversion circuit in the wireless voltage conversion module may be the same circuit.

The first wireless charging circuit can output the maximum electric energy of 20 volts 2 amperes (20V2A), convert it into 10V4A through CP1, and convert it into 5V8A through CP2 into battery D, that is, the first wireless charging circuit can provide the maximum charging power of 40 watts s(W).

The second wireless charging circuit can also output the maximum electric energy of 20V2A, which is converted through the first wireless voltage conversion circuit (including CP3 and CP4) supporting the fast-charging mode. It is converted into 10V4A electric energy through CP3, and further converted into 5V8A electric energy through CP4 into battery D, that is, the second wireless charging circuit can provide a maximum charging power of 40 W.

The wired charging circuit can receive the maximum 20V6A electric energy from the USB interface. The electric energy is converted through two first wired voltage conversion circuits connected in parallel supporting the fast-charging mode. Among them, 20V3A of the electric energy enters the first wired voltage conversion circuit and is converted into 10V6A electric energy through CP1, further converted into 5V12A electric energy through CP2, and enters battery D. 20V3A of the electric energy enters the second wired voltage conversion circuit and is converted into 10V6A electric energy through CP3, further converted into 5V12A electric energy through CP4 to enter battery D, that is, the wired charging circuit can provide a maximum charging power of 120 W.

From the above description, it can be seen that the first wireless charging circuit, the second wireless charging circuit and the wired charging circuit can provide the maximum charging power of 200 W. In this way, when the charging power provided by a single charging circuit is not significantly improved, the overall charging power may be significantly improved.

Figure 7:
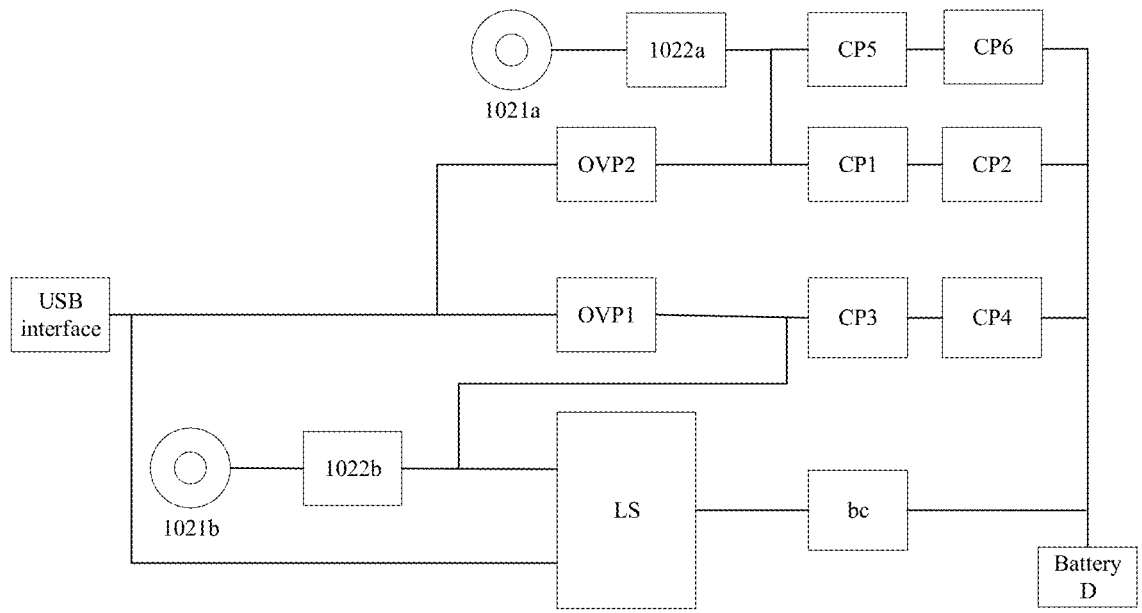
FIG. 7 is a schematic structural diagram of an electronic device provided by yet further still another embodiment of the present disclosure.

Referring to FIG. 7, FIG. 7 illustrates a schematic diagram of another exemplary electronic device formed by a combination of some circuit structures in FIGS. 1 through 5.

As shown in FIG. 7, the circuit structure of the electronic device shown in FIG. 7 is basically the same as that of the electronic device shown in FIG. 6. The only difference is that the wireless voltage conversion module connected to the first wireless charging circuit in FIG. 7 includes two first wireless voltage conversion circuits connected in parallel, one of the two first wireless voltage conversion circuits includes two charger pump voltage conversion modules connected in series, namely CP1 and CP2 respectively. The other first wireless voltage conversion circuit also includes two charger pump voltage conversion modules connected in series, namely CP5 and CP6 respectively. In this way, the two first wireless voltage conversion circuits connected in parallel may be configured to shunt the charging current output by the first wireless charging circuit, so as to reduce the heating.

Figure 8:
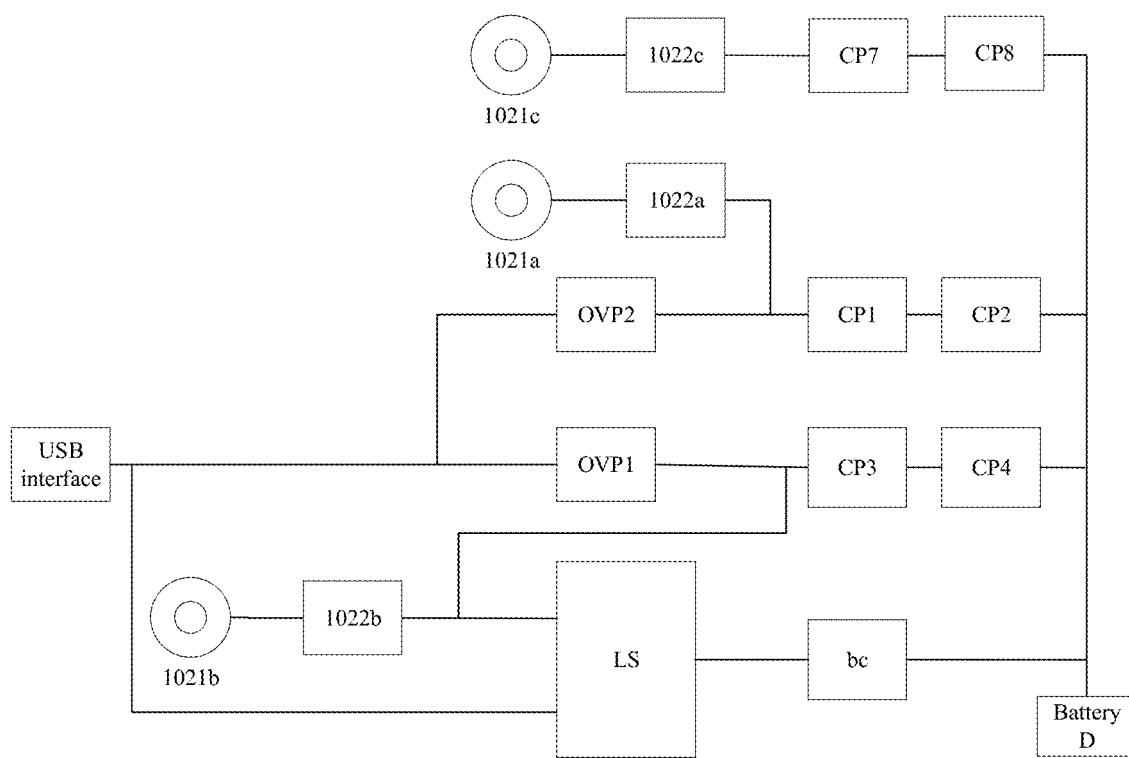
FIG. 8 is a schematic structural diagram of an electronic device provided by even yet further still another embodiment of the present disclosure.

Referring to FIG. 8, FIG. 8 illustrates a schematic diagram of still another exemplary electronic device formed by a combination of some circuit structures in FIGS. 1 through 5.

As shown in FIG. 8, the circuit structure of the electronic device shown in FIG. 8 is basically the same as that of the electronic device shown in FIG. 6. The only difference is that the electronic device shown in FIG. 8 includes three wireless charging circuits, and a third wireless charging circuit includes a receiving coil 1021c and a wireless receiving chip 1022c. The third wireless charging circuit is connected to a wireless voltage conversion module (hereinafter referred to as the third wireless voltage conversion module). The third wireless voltage conversion module includes a first wireless voltage conversion circuit, and the first wireless voltage conversion circuit includes two charger pump voltage conversion modules connected in series, namely CP7 and CP8 respectively. The third wireless voltage conversion module is connected to the battery D of the electronic device.

According to the above description, setting more wireless charging circuits is helpful to further improve the charging power.

An embodiment of the present disclosure further provides a wireless charging system, which includes the electronic device and the wireless charging device described in any of the above embodiments.

In this present disclosure, unless otherwise specified and limited, the terms "connected", "connection" and other terms shall be understood in a broad sense, for example, it may be electrical connection or communication connection. It may be connected directly or indirectly. For those skilled in the related art, the specific meaning of the above terms in the present disclosure may be understood according to the specific circumstances.

In addition, the terms "first" and "second" are only used for descriptive purposes and cannot be understood as indicating or implying relative importance or implicitly indicating the number of indicated technical features, "and/or" describes the association relationship of the associated object, indicating that there may be three relationships, such as A and/or B, which may indicate that A exists alone, B exists alone, and A and B exist simultaneously. The symbol "/" generally indicates that the front and rear associated objects are an "or" relationship.

The technical features of the above embodiments may be combined arbitrarily. In order to make the description concise, all possible combinations of the technical features in the above embodiments are not described. However, as long as there is no contradiction in the combination of these technical features, they should be considered to be the scope recorded in this specification.

The above embodiments only express several embodiments of the present disclosure, and the description is more specific and detailed, but it cannot be understood as limiting the scope of the present disclosure. It should be noted that for those skilled in the related art, several modifications and changes may be made without departing from the concept of the present disclosure, which belong to the protection scope of the present disclosure. Therefore, the scope of protection of the present disclosure shall be subject to the appended claims.

What is claimed is:

1. An electronic device, comprising:
   a wired charging circuit, at least two wireless charging circuits, and a battery, the wired charging circuit and each of the at least two wireless charging circuits being connected to the battery;
   wherein the wired charging circuit is configured to receive input electric energy through a wired power interface and charge the battery with the input electric energy; and
   wherein each of the at least two wireless charging circuits is configured to receive an alternating magnetic field, output electric energy under a driving of the alternating magnetic field, and charge the battery with the output electric energy;
   wherein the electronic device further comprises at least two wireless voltage converters corresponding to the at least two wireless charging circuits in one-to-one manner, each of the at least two wireless voltage converters is connected between a corresponding one of the at least two wireless charging circuits and the battery;
   wherein each of at least one of the at least two wireless voltage converters comprises at least two wireless voltage conversion circuits connected in series, and each of the at least two wireless voltage conversion circuits connected in series is configured to convert at least one of input charging voltage and input charging current, and output at least one of converted charging voltage and converted charging current.

2. The electronic device according to claim 1, wherein at least another one of the at least two wireless voltage converters comprises at least two wireless voltage conversion circuits connected in parallel;
   wherein each of the at least two wireless voltage conversion circuits connected in parallel is configured to convert at least one of charging voltage and charging current output from the corresponding one wireless charging circuit connected to the wireless voltage conversion circuit, and charge the battery with at least one of converted charging voltage and converted charging current.

3. The electronic device according to claim 2, wherein the at least two wireless voltage conversion circuits connected in parallel comprise a first wireless voltage conversion circuit and a second wireless voltage conversion circuit;

wherein the first wireless voltage conversion circuit is configured to convert at least one of the charging voltage greater than a first voltage threshold and the charging current greater than a first current threshold; and wherein the second wireless voltage conversion circuit is configured to convert at least one of the charging voltage lower than the first voltage threshold and the charging current lower than the first current threshold.

4. The electronic device according to claim 2, wherein the at least two wireless voltage conversion circuits connected in parallel are first wireless voltage conversion circuits;

wherein each of the first wireless voltage conversion circuits is configured to convert at least one of the charging voltage greater than a preset voltage threshold and the charging current greater than a preset current threshold.

5. The electronic device according to claim 1, wherein each of the at least two wireless charging circuits comprises a receiving coil and a receiving controller connected with each other;

wherein the receiving coil is configured to receive the alternating magnetic field, and output an alternating current under the driving of the alternating magnetic field; and wherein the receiving controller is configured to control at least one of input and output of the receiving coil.

6. The electronic device according to claim 5, wherein the receiving controller comprises an alternating current-direct current (AC-DC) conversion circuit and a communication circuit;

wherein the AC-DC conversion circuit is configured to convert the alternating current output from the receiving coil into a direct current; and wherein the communication circuit is configured to send charging control data to a wireless charging device through the receiving coil, and the charging control data is configured to instruct the wireless charging device to adjust a charging output power based on the charging control data.

7. The electronic device according to claim 6, wherein the receiving controller further comprises a control circuit, and the control circuit is configured to control a switch transistor in the AC-DC conversion circuit.

8. The electronic device according to claim 6, wherein the electronic device further comprises a processing circuit, and the processing circuit is configured to transmit the charging control data to the communication circuit.

9. The electronic device according to claim 5, wherein each of the at least two wireless charging circuits further comprises a capacitor, and the capacitor is connected between the receiving coil and the receiving controller.

10. The electronic device according to claim 1, wherein the electronic device further comprises a wired voltage converter connected between the wired charging circuit and the battery;

wherein the wired voltage converter is configured to convert at least one of charging voltage and charging current output from the wired charging circuit, and charge the battery with at least one of converted charging voltage and converted charging current.

11. The electronic device according to claim 10, wherein some of circuits of the wired voltage converter shares with circuits of the wireless voltage converters.

12. The electronic device according to claim 11, wherein the wired voltage converter comprises at least two wired voltage conversion circuits connected in parallel, and each of the at least two wired voltage conversion circuits is configured to convert at least one of the charging voltage and the charging current output from the wired charging circuit, and charge the battery with at least one of converted charging voltage and converted charging current.

13. The electronic device according to claim 11, wherein the wired voltage converter comprises at least two wired voltage conversion circuits connected in series, and each of the at least two wired voltage conversion circuits is configured to convert at least one of input charging voltage and input charging current, and output at least one of converted charging voltage and charging current.

14. The electronic device according to claim 12, wherein the at least two wired voltage conversion circuits connected in parallel comprises a first wired voltage conversion circuit and a second wired voltage conversion circuit;

wherein the first wired voltage conversion circuit is configured to convert at least one of the charging voltage greater than a second voltage threshold and the charging current greater than a second current threshold;

wherein the second wired voltage conversion circuit is configured to convert at least one of the charging voltage lower than the second voltage threshold and the charging current lower than the second current threshold.

15. The electronic device according to claim 12, wherein the at least two wired voltage conversion circuits connected in parallel are first wired voltage conversion circuits;

wherein each of the first wired voltage conversion circuits is configured to convert at least one of the charging voltage greater than a second voltage threshold and the charging current greater than a second current threshold.

16. The electronic device according to claim 1, wherein the wired charging circuit comprises an overvoltage protection circuit, and the overvoltage protection circuit is configured to buck a voltage when the voltage exceeds a voltage threshold.

17. The electronic device according to claim 1, wherein at least one of the at least two wireless charging circuits supports a wireless charging Qi protocol.

18. An electronic device, comprising:

a battery;

a wired charging circuit connected to the battery, wherein the wired charging circuit is configured to receive input electric energy through a wired power interface and charge the battery with the input electric energy; and at least two wireless charging circuits, wherein each of the at least two wireless charging circuits is connected to the battery, and configured to receive an alternating magnetic field, output electric energy under a driving of the alternating magnetic field, and charge the battery with the output electric energy;

wherein the electronic device further comprises at least two wireless voltage converters corresponding to the at least two wireless charging circuits in one-to-one manner, each of the at least two wireless voltage converters is connected between a corresponding one of the at least two wireless charging circuits and the battery;

wherein at least one of the at least two wireless voltage converters comprises at least two wireless voltage conversion circuits connected in parallel, each of the at least two wireless voltage conversion circuits connected in parallel is configured to convert at least one of charging voltage and charging current output from the corresponding one wireless charging circuit connected to the wireless voltage conversion circuit, and charge the battery with at least one of converted charging voltage and converted charging current;

wherein the at least two wireless voltage conversion circuits connected in parallel comprise a first wireless voltage conversion circuit and a second wireless voltage conversion circuit, the first wireless voltage conversion circuit is configured to convert at least one of the charging voltage greater than a first voltage threshold and the charging current greater than a first current threshold; and the second wireless voltage conversion circuit is configured to convert at least one of the charging voltage lower than the first voltage threshold and the charging current lower than the first current threshold.

19. An electronic device, comprising:
a battery;
a wired charging circuit connected to the battery, wherein the wired charging circuit is configured to receive input electric energy through a wired power interface and charge the battery with the input electric energy;
at least two wireless charging circuits, wherein each of the at least two wireless charging circuits is connected to the battery, and configured to receive an alternating magnetic field, output electric energy under a driving of the alternating magnetic field, and charge the battery with the output electric energy; and
a wired voltage converter connected between the wired charging circuit and the battery, wherein the wired voltage converter is configured to convert at least one of charging voltage and charging current output from the wired charging circuit, and charge the battery with at least one of converted charging voltage and converted charging current;

wherein the wired voltage converter comprises at least two wired voltage conversion circuits connected in parallel, and each of the at least two wired voltage conversion circuits connected in parallel is configured to convert at least one of the charging voltage and the charging current output from the wired charging circuit, and charge the battery with at least one of converted charging voltage and converted charging current; or wherein the wired voltage converter comprises at least two wired voltage conversion circuits connected in series, and each of the at least two wired voltage conversion circuits connected in series is configured to convert at least one of input charging voltage and input charging current, and output at least one of converted charging voltage and charging current.

20. The electronic device according to claim 19, wherein the at least two wired voltage conversion circuits connected in parallel comprises a first wired voltage conversion circuit and a second wired voltage conversion circuit, the first wired voltage conversion circuit is configured to convert at least one of the charging voltage greater than a second voltage threshold and the charging current greater than a second current threshold, and the second wired voltage conversion circuit is configured to convert at least one of the charging voltage lower than the second voltage threshold and the charging current lower than the second current threshold; or wherein the at least two wired voltage conversion circuits connected in parallel are all the first wired voltage conversion circuits.

* * * * *